(12) United States Patent
Tsao

(10) Patent No.: US 9,390,094 B2
(45) Date of Patent: *Jul. 12, 2016

(54) METHOD AND SYSTEM FOR DISPLAYING AND OPERATING MULTI-LAYERS ITEM LIST IN WEB-BROWSER WITH SUPPORTING OF CONCURRENT MULTI-USERS

(71) Applicant: Sheng Tai (Ted) Tsao, Fremont, CA (US)

(72) Inventor: Sheng Tai Tsao, Fremont, CA (US)

(73) Assignee: Sheng Tai (Ted) Tsao, Fremont, CA (US)

( * ) Notice: Subject to any disclaimer, the term of this patent is extended or adjusted under 35 U.S.C. 154(b) by 320 days.

This patent is subject to a terminal disclaimer.

(21) Appl. No.: 14/077,442

(22) Filed: Nov. 12, 2013

(65) Prior Publication Data

US 2014/0095714 A1 Apr. 3, 2014

Related U.S. Application Data

(60) Continuation of application No. 12/709,434, filed on Feb. 19, 2010, now Pat. No. 8,812,640, which is a division of application No. 11/374,302, filed on Jul. 2, 2004, now Pat. No. 7,945,652, which is a continuation-in-part of application No. 10/713,905, filed on Aug. 12, 2002, now Pat. No. 7,379,990, said application No. 11/374,302 is a continuation-in-part of application No. 10/713,904, filed on Aug. 6, 2002, now Pat. No. 7,418,702.

(60) Provisional application No. 60/402,626, filed on Aug. 12, 2002.

(51) Int. Cl.
*G06F 17/30* (2006.01)
*H04L 29/06* (2006.01)
*H04L 29/08* (2006.01)
(Continued)

(52) U.S. Cl.
CPC ........ *G06F 17/3007* (2013.01); *G06F 17/2247* (2013.01); *G06F 17/30126* (2013.01); *H04L 12/2458* (2013.01); *H04L 41/0253* (2013.01); *H04L 41/22* (2013.01); *H04L 65/403* (2013.01); *H04L 67/1097* (2013.01); *H04L 67/14* (2013.01); *G06F 13/10* (2013.01); *H04L 12/24* (2013.01); *H04L 12/2408* (2013.01); *H04L 12/2424* (2013.01); *H04L 12/2602* (2013.01); *H04L 29/08099* (2013.01); *H04L 41/0213* (2013.01); *H04L 41/0266* (2013.01); *H04L 41/08* (2013.01); *H04L 41/082* (2013.01); *H04L 41/0806* (2013.01); *H04L 41/0893* (2013.01); *H04L 41/12* (2013.01); *H04L 67/02* (2013.01)

(58) Field of Classification Search
CPC ............ H04L 12/2602; H04L 12/2408; H04L 29/08099; H04L 41/08; H04L 12/2458; H04L 12/24; H04L 12/2424
See application file for complete search history.

(56) References Cited

U.S. PATENT DOCUMENTS 6,966,033 B1 * 11/2005 Gasser ................... H04L 41/22
715/738
7,693,976 B2 * 4/2010 Perry .................... H04L 7/0008
340/1.1

(Continued)

*Primary Examiner* — Tom Y Chang

(57) ABSTRACT

The use of hierarchical list to represent and operate resource structure has been practiced by operating system, for example by Windows Explore of Microsoft Windows, for very long time. However, users are lack of Windows Explore like tools to work on resource structure, such as file system, across world wide web ("WWW"). Present invention has disclosed a technology of utilizing memory bound multi-layered hierarchical list to mirror an actual resource structure and presenting the multi-layered hierarchical list to a user across the Internet during a user session for the user through the multi-layered hierarchical list displayed on an end-user device to access and operate the resource structure.

21 Claims, 13 Drawing Sheets

An example of system units are automatically and dynamically grouped by using group ID.

(51) Int. Cl.
*G06F 17/22* (2006.01)
*H04L 12/24* (2006.01)
*H04L 12/26* (2006.01)
*G06F 13/10* (2006.01)

(56) References Cited

U.S. PATENT DOCUMENTS

| | | | | |
|---|---|---|---|---|
| 8,176,155 B2 * | 5/2012 | Yang | G06F 3/14 | 375/240.01 |
| 2001/0049717 A1 * | 12/2001 | Freeman | G06F 9/5027 | 709/203 |
| 2002/0091819 A1 * | 7/2002 | Melchione | H04L 12/24 | 709/224 |
| 2003/0028624 A1 * | 2/2003 | Hasan | H04L 41/0213 | 709/220 |
| 2003/0061323 A1 * | 3/2003 | East | H04L 41/0213 | 709/223 |
| 2003/0233431 A1 * | 12/2003 | Reddy | G06F 9/466 | 709/221 |
| 2003/0233439 A1 * | 12/2003 | Stone | D04B 1/26 | 709/223 |
| 2003/0233571 A1 * | 12/2003 | Kraus | G06F 9/466 | 726/15 |
| 2004/0006614 A1 * | 1/2004 | DiFalco | H04L 41/0893 | 709/223 |
| 2004/0107277 A1 * | 6/2004 | Levesque | H04L 41/044 | 709/223 |
| 2004/0148372 A1 * | 7/2004 | Campbell | H04L 41/0253 | 709/223 |
| 2004/0236752 A1 * | 11/2004 | Han | G06F 21/6218 | |
| 2004/0243945 A1 * | 12/2004 | Benhase | G06F 3/0482 | 715/853 |
| 2005/0120160 A1 * | 6/2005 | Plouffe | G06F 9/45537 | 711/1 |
| 2005/0198245 A1 * | 9/2005 | Burgess | G06F 3/14 | 709/223 |
| 2005/0216860 A1 * | 9/2005 | Petrov | H04L 12/2602 | 715/810 |
| 2005/0229154 A1 * | 10/2005 | Hiew | G06F 8/34 | 717/110 |
| 2005/0278723 A1 * | 12/2005 | Feinleib | H04L 41/22 | 719/310 |
| 2006/0202964 A1 * | 9/2006 | Liaw | H04L 12/24 | 345/168 |
| 2006/0267936 A1 * | 11/2006 | Hoerl | G06F 3/023 | 345/158 |

* cited by examiner

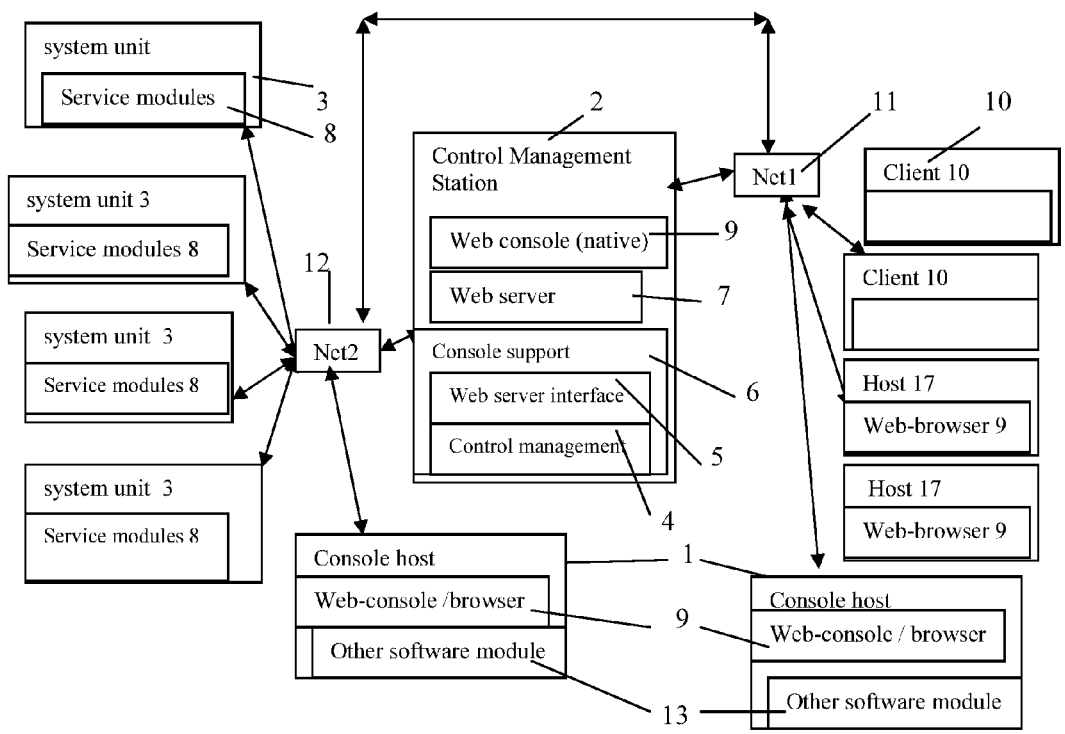
Fig. 1: A Typical CCDSVM with Multiple Clients

Fig. 2 a) An example of a degenerated CCDSVM with a control system only
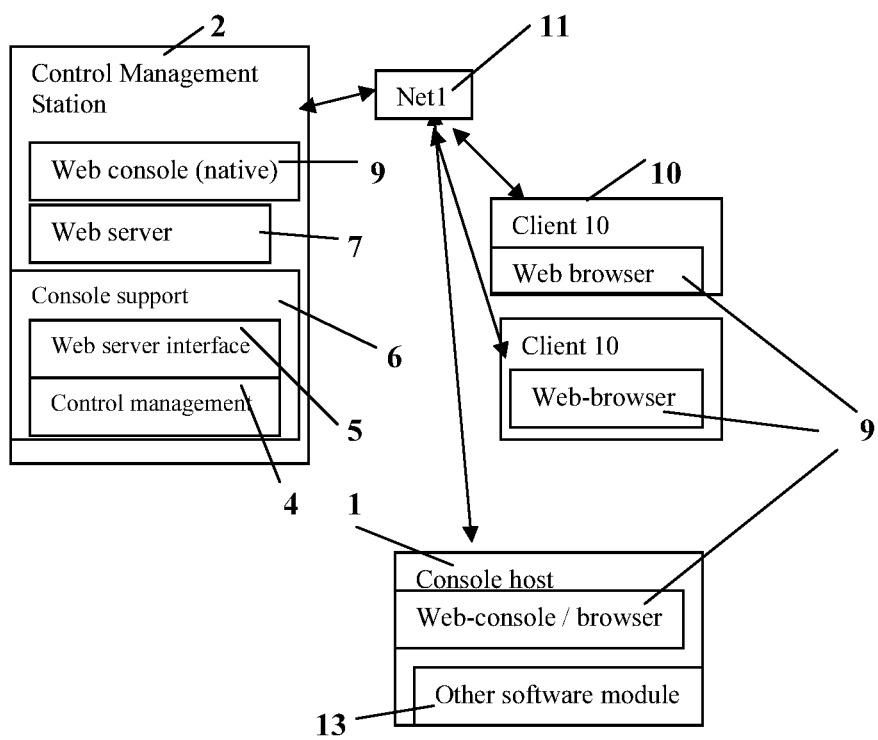

Fig. 2 b) An example of a CCDSVM with identical system unit and client host
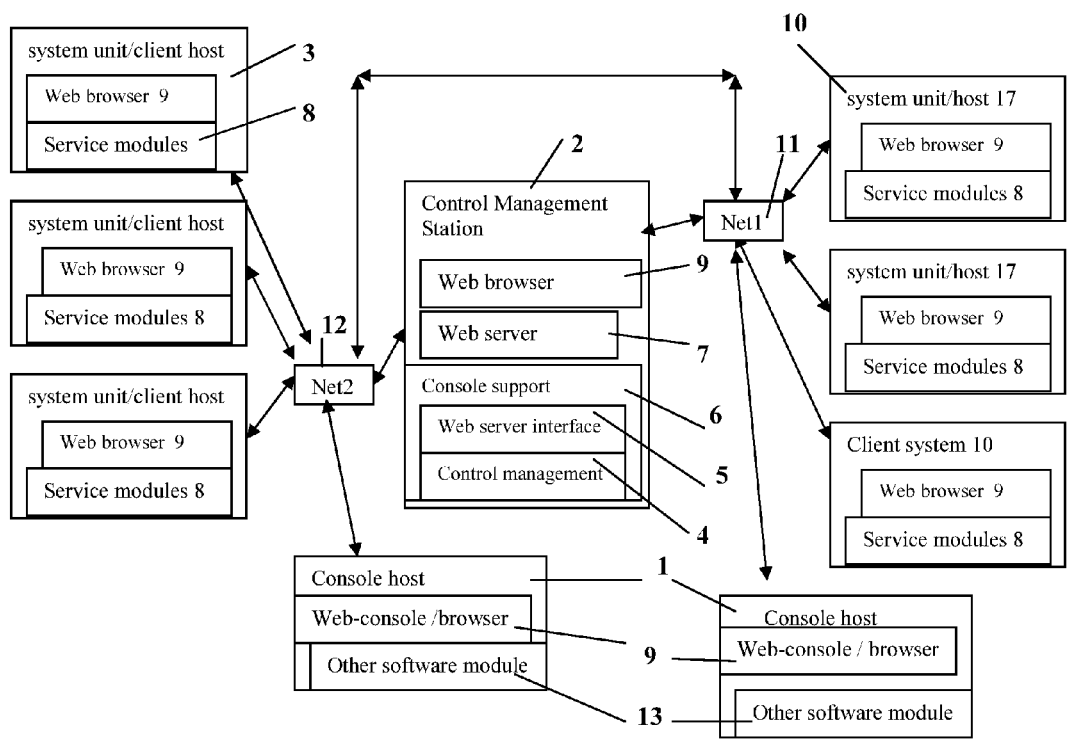

Fig. 2 c) An example of a CCDSVM for non-web based client access and web-based control management
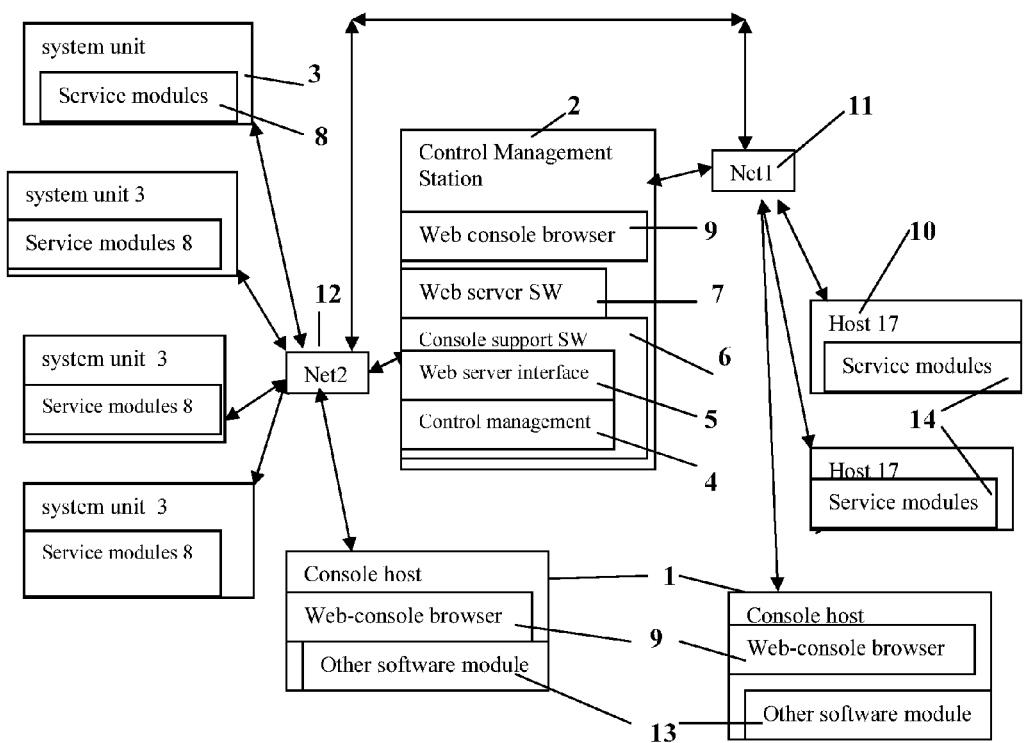

Fig. 3) The Software of WCUWE for a typical CCDSVM:
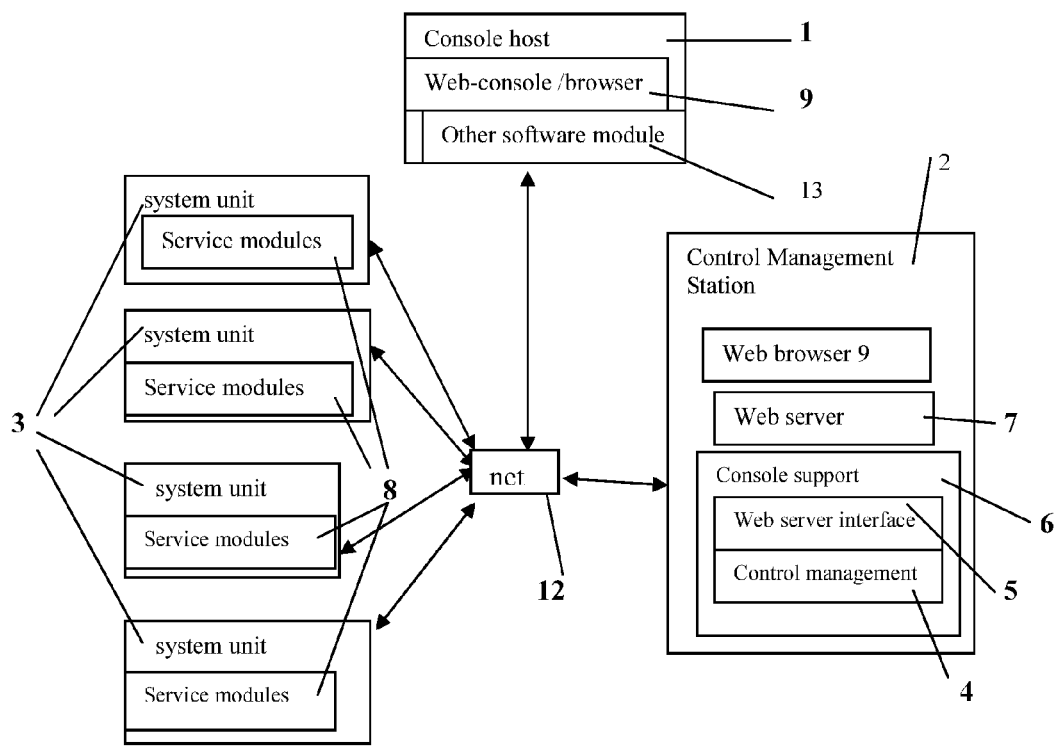

Fig. 4: Examples of Multi-Layer Items List:
4a)
4b)
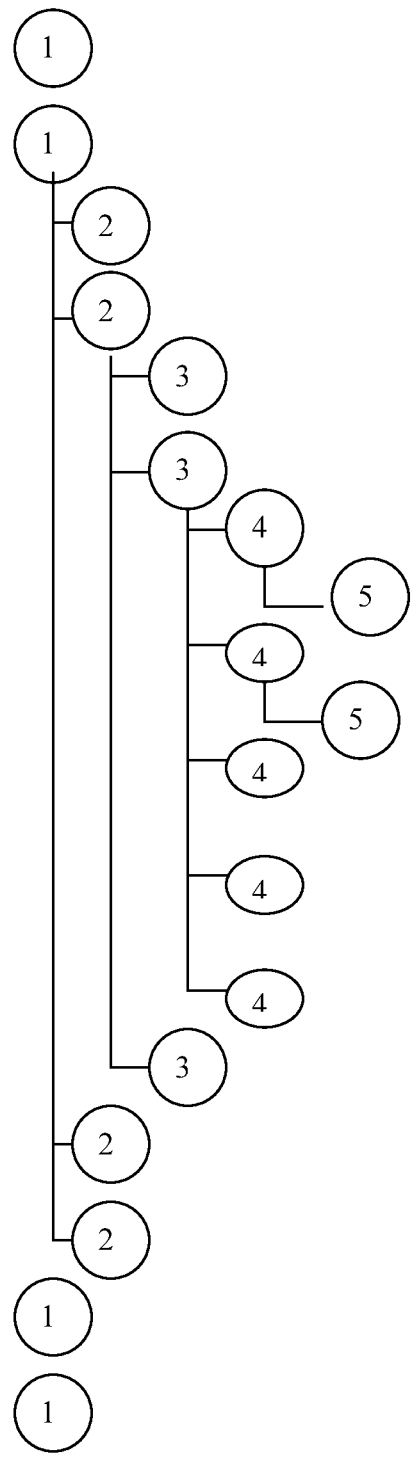

Fig. 5, Examples of web based operation menu
5 a) Web based drop down menu for disk operation.
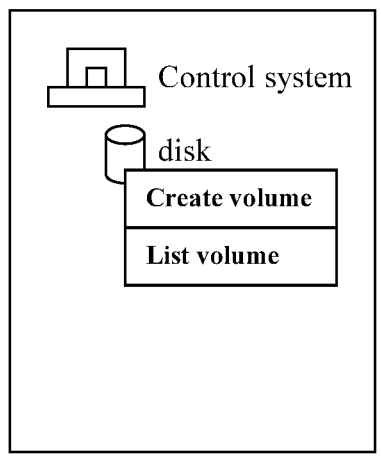
5 b) Web based selective menu for selecting an system unit:
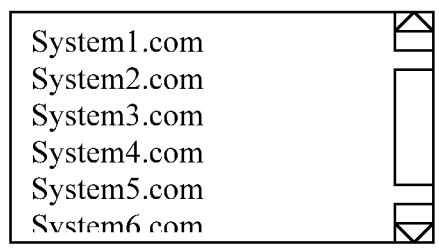

Fig. 6: Examples of web based operation menu for different type of resource node on a MLIL.
6 a) an operation menu for managing a disk storage.
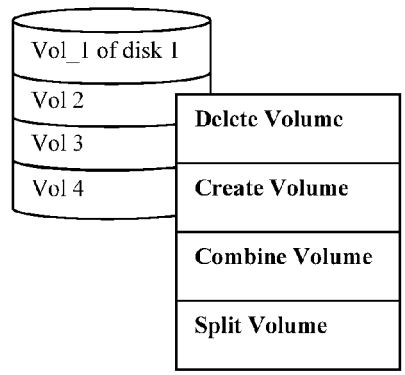
6 b) an operation menu for managing files and folders.
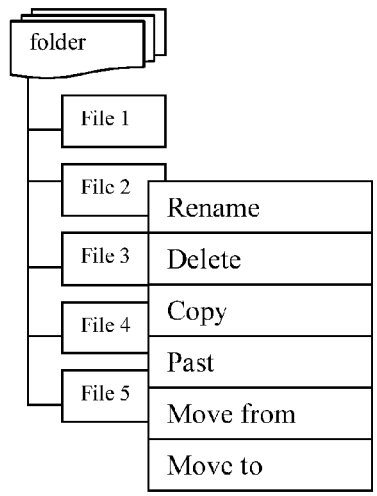

Fig. 6 C) a web based operation menu for managing system units on network.
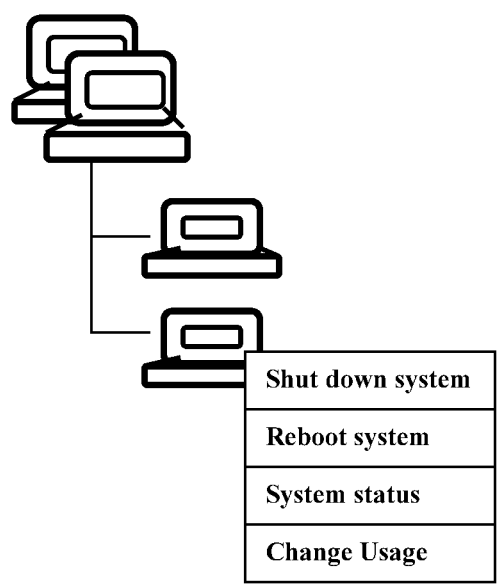

Fig. 7: An example of system units are automatically and dynamically grouped by using group ID.
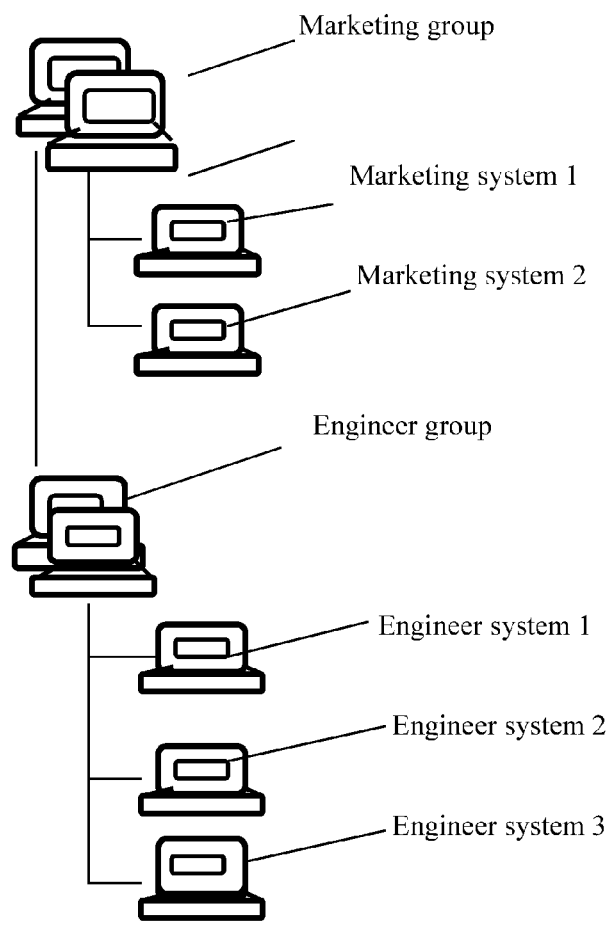

Fig. 8 a): An example of a MLIL representing a structure combined with mixed devices, system units and groups.
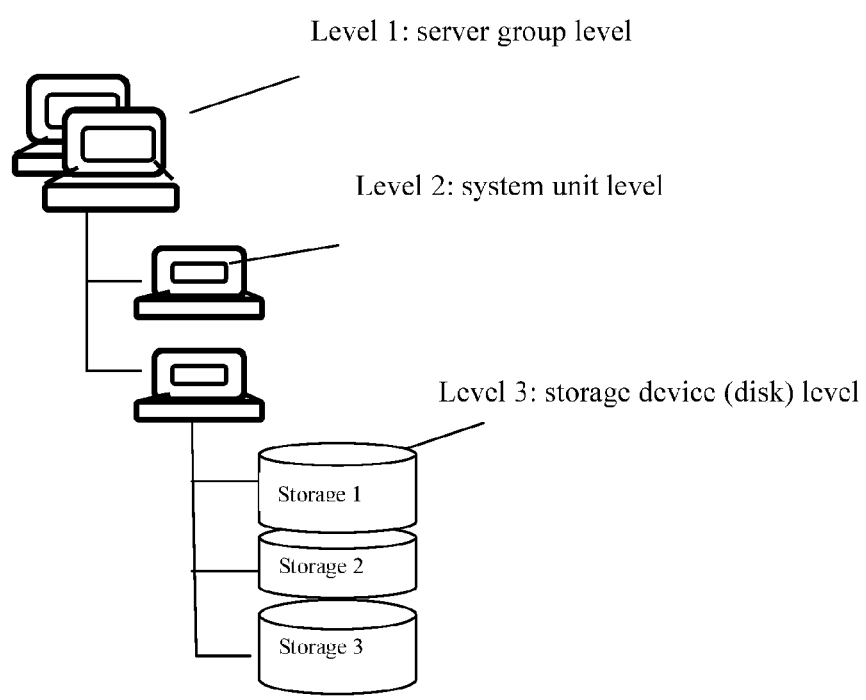

Fig. 8 b) This example illustrates that the top level of a MLIL is for system group, the second level of the MLIL is for system unit, and folders and files start from the third level of the MLIL.
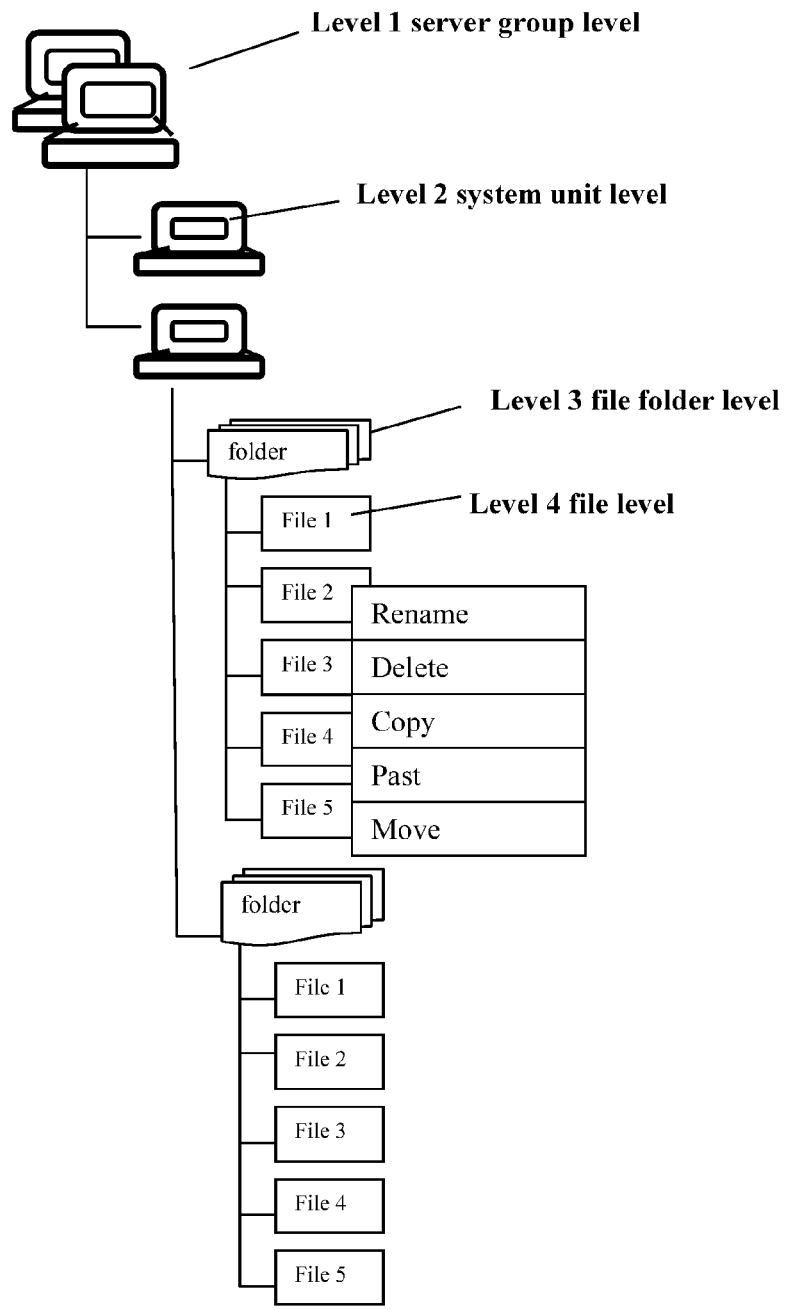

Fig. 9 This figure illustrates one embodiment of how does the file system on a system unit in a system group of the virtual server can be accessed.
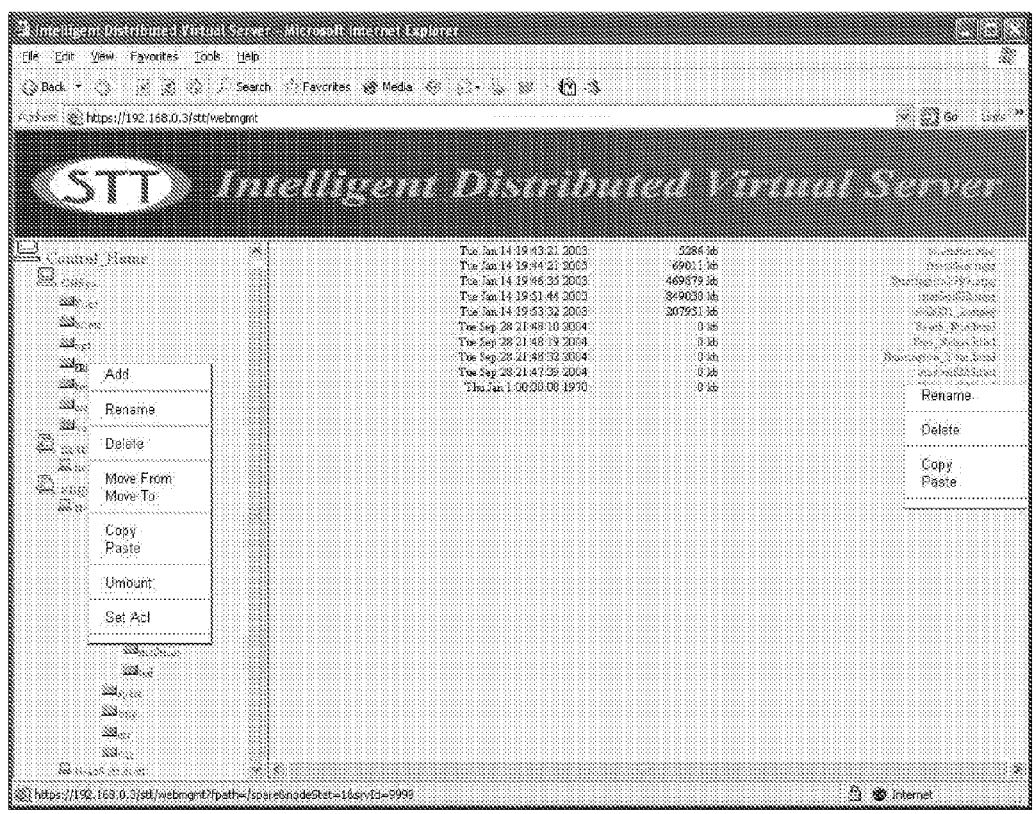

METHOD AND SYSTEM FOR DISPLAYING AND OPERATING MULTI-LAYERS ITEM LIST IN WEB-BROWSER WITH SUPPORTING OF CONCURRENT MULTI-USERS

PRIORITY AND CROSS REFERENCES

This is a continuation application of U.S. patent application Ser. No. 12/079,434 filed on Feb. 19, 2010, now a U.S. Pat. No. 8,812,640, and being a continuation application of U.S. patent application Ser. No. 11/374,302 filed on Jul. 2, 2004 that is converted from provisional application 60/585,552, and now is a U.S. Pat. No. 7,945,652. The application Ser. No. 11/374,302 is a continuation-in-part of U.S. patent application Ser. No. 10/713,904, filed on Aug. 6, 2002 that is converted from U.S. provisional application No. 60/401,238, and now is a U.S. Pat. No. 7,418,702. The application Ser. No. 11/374,302 is also a continuation-in-part of U.S. patent application Ser. No. 10/713,905, filed on Aug. 12, 2002, that is converted from U.S. provisional application Ser. No. 60/402,626, and now is a U.S. Pat. No. 7,379,990. All above mentioned applications are herein incorporated by reference in their entireties for all purposes.

BACKGROUND OF THE INVENTION

1. Field of Invention

The present invention is in the area of network communication, and particularly related to multiple users concurrently interacting with computers to display, view, access, and operate various resources (e.g., via multi-layers item list) by using a web browser In addition, the present invention is also related to methods and steps of constructing a web-based computer user work (operation) environment.

2. Description of Related Art

The evolution of computer-related working environment has changed from paper tape or punch cards of early years to a command line user work environment on a native system in 70th, and to a graphic window environment of a computer system in the middle 80th. Since then, there have been some network-based computing environments developed such as Microsoft's terminal service, the Telnet of Unix & Linux system, and etc. These computing environments allow users from a computer system to access and operate a designated remote computer system. Some network management software has also been developed to mostly focus on monitoring activities of a remote computer system. However, most of the software are limited in mobility and capability because they need to install specialized software on the user's native computer system.

There are some web-based applications that allow a user to access web applications served by a web server from a web browser running on a remote computer system or device of the user. However, most of such applications are not designed for managing resources on the web server and not design for creating a web-based computer user working environment. There are also some web-based applications that allow people to access and manage a computer system remotely by dumping an existing computer user work environment of the computer system to a web browser on a user's local computer system that results providing limited access and operation capability to the user. Thus there is a need for a user-friendly environment that users can concurrently access and manage resources with ease.

SUMMARY

This section summarizes some aspects of the present disclosure and briefly introduces some aspects in preferred embodiments. Simplifications or omissions in this section as well as in the abstract or the title of the present disclosure may be made to avoid obscuring the purpose of this section, the abstract and the title. Such simplifications or omissions are not intended to limit the scope of the present disclosure.

Generally speaking, the present invention is related to a user-friendly environment that users can concurrently access and manage resources with ease. According to one aspect of the present invention, a web-based computer user working environment (herein "WCUWE") is disclosed. Some aspects of the WCUWE are described in co-pending U.S. application Ser. Nos. 10/713,904 and 10/713,905, both of which are hereby incorporated by reference in each one's entirety. A central-controlled distributed scalable virtual machine (herein "CCDSVM") is formed to achieve and realize a flexible working environment for users of the CCDSVM. The WCUWE provides a mechanism to allow users to access and operate the provisioned systems of a CCDSVM from a web browser on a remote system or electronic devices. With the capability of expanding a CCDSVM across the Intranet and Internet with its strong security control, the WCUWE can meet the increasing demand for a more secure, more mobilized, more flexible and more cost saving computational solution.

BRIEF DESCRIPTION OF THE FIGURES

These and other features, aspects, and advantages of the present invention will become better understood with regard to the following description, appended claims, and accompanying drawings where:

FIG. 1 shows a system view of a CCDSVM according to one embodiment of the present invention;

FIG. 2*a* shows an exemplary CCDSVM with a single control management system;

FIG. 2*b* shows an exemplary CCDSVM with identical client host and system unit;

FIG. 2*c* shows an exemplary CCDSVM with client hosts for non-web based accessing;

FIG. 3 is an example of functional block diagram of a WCUWE for the CCDSVM;

FIG. 4 shows a simplified example of a multi-layered item list;

FIG. 5 shows some examples of an operation menu for WCUWE;

FIG. 6 shows an example of an operation menu for different types of nodes;

FIG. 7 shows an example of server units grouped by a group ID;

FIG. 8 shows examples of a multi-layered item list with items from other devices, system units or groups; and FIG. 9 shows an example of how the file system on a system unit 3 in a group can be accessed.

DETAILED DESCRIPTION OF THE INVENTION

The detailed description of the invention is presented largely in terms of procedures, steps, logic blocks, processing, and other symbolic representations that directly or indirectly resemble the operations of data processing devices. These process descriptions and representations are typically used by those skilled in the art to most effectively convey the substance of their work to others skilled in the art. Numerous specific details are set forth in order to provide a thorough understanding of the present invention. However, it will become obvious to those skilled in the art that the invention may be practiced without these specific details. In other instances, well known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

For the convenience of describing some embodiments of the invention, the following terminologies are provided.

CCDSVM:

It is an abbreviation for central controlled distributed scalable virtual machine. A CCDSVM is configured, in one embodiment, allowing a control management system to control a group of systems (e.g., server computers) and provide distributed services to a client device coupled to the Intranet, the Internet or in a local area network (LAN) environment. The software components of the CCDSVM form a virtual operating environment or system.

Computer User Working Environment (CUWE):

Every computer system provides an end user a working environment which usually runs on top of a generic computer operating system. The CUWE allows a user to setup an authentication profile for each different user, to configure system resources from storage, network, file system, file folders structure, files and all other available resources on the computer system, to monitor system activities, to access applications, and to manage data files such as moving data from one folder to another folder or moving data from one system to another system and etc without limits. According to one embodiment of the present invention, a CUWE is configured to provide a multi-task mechanism. Therefore, a user can perform multiple tasks concurrently after successful log in the CUWE.

Web-Based Computer User Work Environment (WCUWE):

The web-based computer user work environment (WCUWE) runs on top of a generic operating system in a single or multiple computers. It allows a user to work on one or more computer systems from a conventional web-browser on a remote computing system (device) of the user or from a conventional web browser on each of the one or more computer systems. It provides great mobility and flexibility to the user(s). With this web-based computer user work environment, the entire CCDSVM system can operate like a single virtual machine.

Resources:

In general, resources on a computer system or electronic device refer to, but not limited to, CPU, memory, storage device, network device, monitor or other display devices, keyboard, mouse, photo or video record devices, wireless device, user authentication profiles, and various form of deposited data in storage devices. The deposited data in storage devices could be a file system structure, folders, data files, formed raw data and etc. and is not limited to these in this invention. A data file can be in all kinds of form, such as plain text form, binary data form, PDF form, MPEG or JPEG form, or other various image data forms, MS power point data form or Word documentation form etc. without limits. The storage device could be in a media form such as hard disk drive, magnetic tape drive, various form of memory devices, or others suitable media without limits. it should be noted, unless specifically discussed, whenever a resource in a computer, a system or a device is discussed, it means any form of computing power, data, or capacity that the computer, the system or the device has or able to access.

Standard Structured Information:

A web browser can interpret the standard structured format (formatted information) and display the formatted information in web pages so that people can view, manipulate, and interact with the information. The standard formatted information is imposed and encoded by following the syntax of a programming language such as HTML (Hypertext Markup Language), XHTML, DHTML, XML, or any other various suitable languages, whichever is best to present the structured information. In practice, these languages (HTML, XML, . . . ) themselves are often referred to as a standard for web page programming. Therefore, in this disclosure, it is not necessary to specify what standard is being used as long as data or resources are presented in a way that is suitable for web communication.

Multi-Layered Item List (MLIL):

A multi-layered item list is a logically organized information list with certain order. Each entry in an MLIL contains an item that may contain another layered list of items, where each of the items may represent a physical resource or information of a computer system or other devices. For example, the information of files and folders of a file system on a modern computer system is typically organized as a multi-layered item list and can be entirely viewed, displayed and operated in a UI window on the computer system supported by modern computer operating system. Likewise, each item (also referred to as a node) on an MLIL may represent a folder or a file. According to one embodiment of the present invention, the information of systems or devices on a network, the information of hardware components on a system such as disks, network cards, memory, the information of users of a system can also be organized into an MLIL. The supporting of the MLIL in a WCUWE makes the system resources and information much easy to be displayed, viewed, and operated from a browser. In general, an MLIL contains at least one item (node) and as many as multiple hundreds items (nodes) depending on the needs.

The System:

The system mentioned in this invention is computing system that can be a desktop computer, laptop computer, various types of server computers, PDA, or cell phone or other devices with communication ability across a communication network. The systems mentioned here are just for illustrating only and do not limit the scope of the system mentioned in this invention.

The OS (Operating System):

The OS mentioned in this invention can be a suitable operating system such as Windows, Linux, various Unix, real-time operating system and others without limits.

Programming Languages:

The programming languages, which used for implementing all software mentioned in this invention, could be a suitable language or a combination of the suitable languages such as C, C++, Java, JavaScript, Visual Basic, C sharp, HTML, XML, DHTML, XHTML, and others without limits Communication Protocols:

The communication protocols to be used in the CCDSVM could be various types that are appropriate for transmitting required data across a communication link. The communication protocols could be IP-based or non-IP-based. The IP based protocols are built on top of IP protocol that could be standard protocols such as TCP protocol, UDP protocol, ICMP protocol, and others without limits. The IP based protocols also can be non-standard proprietary protocols. The non-IP based protocols, for one example, can be ISO 8473, ISO 8208, or serial communication, or data link layer protocols like LLC 802.2, or HDLC, or any proprietary protocols bellow the IP protocol level without limits.

The Communication Protocols for Web:

The communication protocols for web computing could be HTTP, SOAP, WAP, or others without limits.

The Web Browser:

The web browser could be a existing commercial software from a vendor such as Microsoft IE, Netscape, Firefox, Mozillar, or other commercial or proprietary software. The web browser must be capable to handle web protocols such as HTTP, SAOP, WAP or others, and be able to interpret the standard structured formatted information such as web page.

The Web Server Software:

The web server software mentioned in this invention could be a commercial software from a vendor such as Apache of open source foundation, IIS of Microsoft Corporation, or others on the market, and it also can be a proprietary software. The web server software must be able to handle web protocols such as HTTP, which is a protocol built on top of TCP protocol. Therefore, the structured information for web communication can be transmitted to said web browser across a communication link by the web server if the web server and web browser are located on two different computer systems. The web server and web browser also can communicate with each other through inter-process communication if both of the web server and web browser are located on a same computer system.

User Session with the CCDSVM:

A user session is started at a time a user log-in to a CCDSVM from a web-browser on an end-user computing system and is ended at a time the user logout the CCDSVM from the same web browser. During a session, users can perform tasks which have been permitted by a security profile for the user.

One of the objects, advantages, and benefits in the present invention is to provide a web based computer user working environment ("WCUWE") in which users can access resources available in an environment, which includes a plurality of resources residing among a plurality of computer systems. According to one embodiment of the present invention, such resources can be accessed and managed from a web-browser regardless where the user's computing system located. In addition, said environment permits each of multiple users from his or her own web-browser to concurrently access and manage the CCDSVM with multi-tasking capability.

Since the introduction of graphic user interface in an operating system for computers, users are able to display, view and operate information and resources of a computer system or device by using a pointing device (e.g., a mouse). By clicking through a multi-layered item list, such as a file and folder list displayed in Window Explore of Microsoft, a user can navigate to an item in any level in the list. In other words, supporting a multi-layered item list has become a critical part of a window based computer user work environment. However, within WCUWE of the CCDSVM, how to let multiple concurrent users to effectively simultaneously display, view or operate an item list in a single web-browser for the available resources, such as for deeply nested files & folders or for multi groups of provisioned systems or devices etc. is an unprecedented challenge.

Referring now to FIG. 1, it shows an exemplary simplified block diagram of an embodiment of a typical CCDSVM. As shown in the figure, the CCDSVM is a collection of computing systems including console hosts 1, a control management system 2, system units 3, and client hosts 10 that are connected to each other via net1 10 and net2 11 and are described in detail below.

Console Hosts 1:

A console host can be a computing system on a network and run with a suitable OS. However, it must have a web browser 9 installed, which to be used for accessing and operating the CCDSVM. The web-browser 9 can be implemented with a suitable or a combination of suitable programming languages. One example of the browser 9 is the Internet Explorer (IE) from Microsoft Corporation. Optionally, Web-Console is another name for the web-browser 9 on a console host 1. From the web browser 9 by following a web URL link to another system or on the same system, a user can obtain a WCUWE and further access, manage and operate the entire system. The term of the web-console used sometimes is to indicate its ability to access system information and perform system operation over the CCDSVM by privileged users. A console host 1 may also include other software modules 13, which may be implemented with a suitable programming language. The software modules 13 may communicate with a control management system 2 using IP based, non-IP based protocols or a suitable protocol to receive or send data between the console host and the control management system 2. To support a non-web-based networked console, the software modules 13 used for the console must handle protocols other than web protocols such as HTTP, SOAP, WAP. Further software modules 13 of the console host 1 must communicate with console supporting software 6 on the control management system 2. The console host 1 is similar to the client system 10 except it may be dedicated to a user who takes a system administration role for the CCDSVM.

Control Management System 2:

The control management system 2 is a computing system on the network and has a suitable OS running. The control management system 2 includes web server software 7 and console supporting software 6. The console supporting software 6 includes web server interface software modules 5 and control management software modules 4. The control management system 2 may also have a Web browser used as a web-console 9. The web server software 7 is configured to send data to and receive data from the web console 9 on each of the console hosts 1 or from a web-browser of client 10 based on HTTP or other suitable protocols for web contents delivery.

The console supporting software 6 and the web server 7 can be implemented with a suitable or a combination of suitable programming languages. In one embodiment, the web server interface 5 of the console support software 6 may be extended to provide service as the web server software 7 does. In this case, there is no specialized web server software 7 needed.

System Unit 3:

The system unit 3 could be a computing systems having a suitable OS running and having service software modules 8 configured to communicate with other computing systems on the network. For example, the service software modules 8 of the system unit 3 can communicate with the control management software 4 of the control management system 2 to carry out tasks for viewing or operating resources configured on the system unit 3. For other examples, it also can communicate with the client 10 to deliver the required services to them, or to communicate with another system unit 3 to transfer data.

The service software modules 8 may include an individual software module dedicated to handle the HTTP protocol or other web protocols if there is a need for web-based communication with the client 10 or other system unit 3 or the control management system 2. This individual software module could be commercially available web server software on the market or could be a proprietary software module.

Net1 11 and Net2 12: each of Net1 and Net 2 is a network infrastructure including the Internet or the Intranet, local area network (LAN) and wide area network (WAN). In one embodiment, Net 1 provides communication links between the control management system 2 and the console-host 1 or the client hosts 10. It also provides communication link between the system unit 3 and the client host 10. The net1 may comprises connection media including cable of Ethernet, optical Fibre, and other, comprises wireless communication media for wireless communication links through air, and comprises data bus on circuit board. The Net1 also consists of communication equipment such as switches, routers, and adapters, and all other possible elements of communication equipment without limits.

The Net2 comprises similar connection media and equipment mentioned above and provides communication links between the control management system 2 and the system units 3 or the consoles host 1. It also provides the communication link between the system unit 3 and the client host 10.

Client Host 10:

The client hosts 10 are not part of the CCDSVM, but with the permission and authorization, they can get services from and access to the CCDSVM using the web-browser 9.

The data flows in the CCDSVM:

According to one embodiment, there are 4 basic data flows within a typical CCDSVM:

(1) Data path 1 is for data flow through a communication link between the web browser 9 on the client host 10 or the console host 1 or the control management system 2 and the web handling software on the control management system 2, such as web-server 7 and the console support software 6. With this path of data flow, whenever the user submits (sends) a request from the web-browser 9 to the web-server 7 and further down to the console support software 6, the console support software 6 collects all required information (i.e., metadata) from a target system and converts them into standard structured information for web communication. The targeted system could be the system unit 3 or the control management system 2 itself. The information collected by the console support software 6 in the control management system 2 could be system status, or the storage information, or the network information, or the user authentication profile, or the file system information or files and folders information on the target system. The collected information does not limit to those mentioned above. The console support software 6 then passes this converted structured information to the web server software 7 and further transmits them to the web-browser 9 through communication link, net1 11 or net2 12, so that the information can be displayed and viewed by the conventional web browser 9. The communication protocol used between the web-browser 9 on the client host 10 or the console host 1 and the web server 7 of the control management system 2 could be the HTTP or other suitable protocols for web communication, which could successfully transmit the data over the web.

(2) Data path 2 is for data flow through communication link between the control management system 2 and the system units 3.

With this path of data flow, the requests targeted to the system units 3 are passed from the console support software 6 of the control management system 2 to the service modules 8 of the system unit 3 through the communication link net2 12. If responses to those requests must return back to the control management system 2, the service modules 8 in the system unit 3 carry out the requests and then send the response back to the console support software 6 of the control management system 2. The communication protocol used between the console support software 6 of the control management system 2 and the service modules 8 of the system unit 3 can be a suitable protocol for transmitting data between them. The typical data flow through this path could be a boot message, a system status, network information, or storage information of the system unit 3. It should be noted that the actual data flow though this path is not limited to those mentioned.

(3) Data path 3 is for data flow through a communication link between the system units 3 and the client host 10 or the console host 1.

With reference to FIG. 1, in some cases, the console support software 6 of the control management system 2 may present a web link, which pointed to an object on a system unit 3, to a user on a web-browser 9 of the client host 10, the console host 1, or the control management system 2. The object pointed to by the web link on the system unit 3 could be an MPEG video, a file (e.g., a text file, PDF, MS power point or MS Word document), and is not limited to these types. It could also be a link of another web application service program. From the web browser 9, the user can directly access the information on the system unit 3 pointed to by the web link without going through the control management system 2 again. In this case, the service modules 8 of the system unit 3 must also include a web server software to directly support the web browser 9 access.

(4) Data path 4 is for data flow through a communication link between a system unit 3 and another system unit 3.

With this path, the service modules 8 of the system unit 3 can directly transmit data or information to the service modules 8 of another system unit 3 via the communication link net2 12 without going through the control management system 2. The communication protocol between the system units 3 could be IP-based or based on a suitable non-IP-based protocol. The data and information transmitted through the path 4 can be in various type such as a data file. For example, a user on the web-browser 9 may navigate through a file folder on a system unit 3. Later, the user instructs to transfer a file from the folder on the system unit 3 to another targeted system unit 3 by mouse click, therefore, the data file will be transferred directly between two system units 3 without going through the control management system 2 again.

The Variation of the CCDSVM Configuration Models:

FIG. 2a illustrates an example of a CCDSVM with a single control management system. With this model, there is no system unit 3, therefore, the CCDSVM is degenerated into a single system and the WCUWE just works for the single system, which is the control management system 2. Thus a user from the web-browser 9 on a console host 1, a client host 10, or the control management system 2 can access and operate the entire resources on the control management system 2.

FIG. 2b is an example of a CCDSVM with identical client host and system unit. This model is substantially similar to the model of the typical CCSDVM shown in FIG. 1, except there is no difference between the client host 10 and the system unit 3 since each system unit 3 is also configured with a web-browser 9 and each client host 10 is also configured with service modules 8. This means that each system unit/client shall play both roles of a system unit 3 and a client host. With this model, a user on each system unit/client can login the control management 2 from a web-browser 9 and further access and operate the resources on the control management system 2, or on other system units or clients 3 with a security permission.

FIG. 2c is an example of a CCDSVM with non-web based client host. This model is substantially similar to the model of an exemplary CCDSVM shown in FIG. 1, except that the client host 10 has its own service modules 14 for non-web based access instead of using a web-browser for accessing. For example, if the system unit 3 is a SAN unit providing storage volumes, and one of the service modules 14 of the client host 10 is a driver routine for reading data from and writing data to a disk volume on the system unit 3. The client host 10 may also have a web-browser 9 to access the system unit 3 for other purposes except for accessing disk volumes.

FIG. 3 shows an example of software modules of the WCUWE for a typical CCDSVM. The software modules of the WCUWE can be implemented with a suitable or a combination of suitable programming languages such C, C++, Java, JavaScript, Visual Basic, HTML, XML, etc., which means that software of the WCUWE is programming language independent.

In one embodiment, the software of the WCUWE may include following:
1) web server interface modules 5 of the console support software 6 on the control management system 2.
2) control management modules 4 of the console support software 6 on the control management system 2.
3) web server software 7 on the control management system. The web server software 7 could be commercially available web server software on the marketing such as Apache or MS IIS or others, and also could be a proprietary software. If the web server interface modules 5 provide compatible functionality with the web server software 7, then the web server software 7 is not needed.
4) service software modules 8 on the system unit 3. The service software modules 8 may include web server software 7 or a software module, which provides equivalent functionality as the web server software 7 does.
5) web browser 9 on the console host 1, on the control management system 2, or on the client host 10. The web browser 9 could be a commercial web browser on the market such as MS IE, or Netscape, and also could be proprietary software modules.

FIG. 4 shows simplified examples of a Multi-Layered Item list (MLIL).
FIG. 4a) illustrates a multi-layered item list contains multiple nodes at multiple layers. A node on an MLIL can be expanded to display sub-node if there is any by mouse clicking. The sub-nodes may be reduced by mouse clicking on the same node again.
FIG. 4b) illustrates a degenerated Multi-layered items list containing a single node (i.e., a single layer).

FIG. 5 shows simplified examples of operation menu for the WCUWE of a CCDSVM.
FIG. 5a) illustrates a web based drop-down menu for disk volume management. The drop-down menu can be invoked by right clicking on an item (node) on MLIL.
FIG. 5b) illustrates a web based selective menu for system unit management. The item can be selected and further click the submit button.

FIG. 6 shows simplified examples of operation menu for different types of node on an MLIL.
FIG. 6a) illustrates an operation menu for managing the storage (disk).
FIG. 6b) illustrates an operation menu for managing the file.
FIG. 6c) illustrates an operation menu to manage the system unit on network.

FIG. 7 shows an example of system units grouped by a group ID.

This figure shows one example of five system units being divided into two groups, a marketing group and an engineer group. The marketing group contains 2 system units while the engineer group contains 3 system units. The groups are automatically and dynamically formed when the system units boot up.

FIG. 8 shows examples of an MLIL combined with mixed devices, system units and system groups.
FIG. 8a) shows an example that at the top level of an MLIL is system group, at the second level is system unit, and at the third level is device of disks.
FIG. 8b) shows an example that at the top level of an MLIL is system group, at the second level is system unit, and the third level start with a file folder comprising files.

The Initiation of the WCUWE:

The WCUWE can be established via a sequence of steps, these steps are performed by the software of the WCUWE, especially by the console support software 6 of the control management system 2 described below:

Referring back to FIG. 1,

According to one embodiment, the console support software 6 collects information for all major resources of the control management system 2 and converted the information to a standard structured format, which is viewable in the web-browser 9. The resources mentioned above include storage, network, file system, files, folders, users, system status etc, which can be collected whenever the control management system 2 is boot up or at an appropriate time. The information of the resources may be stored in memory for fast retrieve at later time and also may be stored in permanent storage such as disks.

The console support software 6 also communicates with the service modules 8 of each of the system units 3 to collect information about major resources from each of the system units 3 through the communication link net2. Further, the console support software 6 binds the collected information of the system units 3 to a network information list on the control management system 2. In addition, upon a users' accessing, the network information on the list is organized and converted to a standard structured format for web communication, therefore, is viewable through the web-browser 9. The network information includes the information of the system units 3 and their storage devices, network devices, wireless devices, video and audio record & playback devices, file-system, users, system status and all others on the net2. The network information can be collected whenever each of the system units 3 is boot up or at other appropriate time.

Further, the network information list on the control management system 2 can be kept in memory for later fast access and can be organized using a suitable logical structure, for example as a simple list of array, a linked list, a double linked list, a hash table, a tree structure and etc. The network information list can also be stored on permanent storage such as disk or others for the backup purpose. In addition, the network information can be stored in a permanent storage in a form of commercial database, binary record file, flat text ASCII file or others form. All specific exemplary forms of data depository or logical structure mentioned above are for illustration only, and they shall not be limited herein in this invention.

After the initiation of the WCUWE, each of users are allowed to login from a single web-browsers 9 to the CCDSVM, and various resources and information of the CCDSVM can be displayed, viewed, accessed, or operated by each user from the web browser 9.

Users Interaction, Access and Manage Resources with the WCUWE:

Users on the client host 10, the console host 1, or the control management system 2 can log into the WCUWE of the CCSDVM via a web URL link provided by the software of the WCUWE (see FIG. 3). The software of the WCUWE presents information and resources of the control management system 2 and the server units 3 to each of the users after each of their login from a web browser 9. Subsequently, whenever a user requests to access or operate a resource residing either on the control management system 2 or the system unit 3 of the CCDSVM, the software modules of the WCUWE create a corresponding user task for the request to be processed on the targeted system. In one embodiment, the software modules of the WCUWE are configured to support multiple concurrent tasks from a single web-browser 9 and support multiple concurrent users each of which from a web-browser to perform such tasks while providing security protection for the resources being accessed.

The Use of Multi-Layer Item list in the WCUWE:

In order to provide convenience for each of the login users to perform tasks in the WCUWE, the console support software 6 may use a logical structure of multi-layer item list (MLIL) illustrated in the FIG. 4 combined with using associated web-browser based operation menu illustrated in FIG. 5 for operating corresponding actual multi-level organized resources. The resources as mentioned before could be the files, and folders of a file system, the system units 3 on the network, the users and their security profile etc. If there is a need to create a structured multi-layer item list (MLIL) for resources of the CCDSCM upon each login user trying to access and operate, the console support software modules 6 of the control management system 2 are configured to do the following:

a) For each session of each of the login users, a memory management module of the console support software 6 creates a MLIL which can be flexibly expanded or reduced by mouse clicking while being displayed in a web-browser. Further, the console support software 6 makes an association between each created logical structure of the MLIL and the actual targeted resources. The created MLIL can reside in memory and can be in any form of a list structure such as a simple array list, link list, double link list, various tree structure, or hashed table, without limit.

b) For each created MLIL, binding a corresponding graphic or text representation to each node (item) on the MLIL for the purpose of displaying, and associating each node (item) with appropriate attributes. The attributes shall reflect characteristics of the actual resources, such as name, type, level, size etc. and of course it is not limited to these, therefore, the resources can be correctly displayed and operated through the MLIL.

c) Link an operation menu to the MLIL. The operation menu can be either a web-based drop-down menu 1 as shown in FIG. 5 *a*) or a non-drop-down selective menu 2 as shown in FIG. 5*b*).

d) Convert the created MLIL and all its associated information into the standard structured information for web communication, which to be viewable in and accessible via the web-browser 9. Thereafter, the MLIL can be either viewed by a web-browser 9 on the control management system 2 or viewed by a web-browser 9 on the client host 10 or the console host 1. The converted logical item list needs to be transmitted, via a communication link of net1 11 or net2 12, from the control management system 2 to the client host 10 or to the console host 1. The converted logical item list can be transmitted using a web protocol such as HTTP or other suitable protocols in order for users remotely view it from the web-browser 9.

e) After user taking an action of either viewing, or operating one of the resources represented by the MLIL, the console support software 6 modifies the MLIL through the memory management module of the console support software 6. Also, the memory management module of the console support software 6 keeps tracks of the memory usage and status for the correspondent MLIL as the results of expanding or reducing the MLIL upon a user access or operate a resource represented by this MLIL. For example, deleting a file folder operation requires to delete an actual folder on a file system and to delete the corresponding node on the MLIL. Most importantly, all processes or threads created to perform tasks of operating the resource represented by the MLIL can effectively share the dynamically modified MLIL with a consistent view throughout the user's entire login session. The memory management module of the console support software 6 may need to translate and map the initial logical memory address of the MLIL to another logical memory address, therefore, the different processes or threads of the same user session can effectively access the same actual MLIL memory object during the user session, f) The steps described from b) to e) above can be repeatedly processed as long as a user keeps working on the same resources represented by this specific MLIL.

For each of logout users, the created MLIL for the user session will be deleted through the memory management module of the console support software 6. Further if a user stops access the current related resource and requests to access a total different resource, the original MLIL will be deleted and a new MLIL will be created.

The Support of Deeply Nested Files & Folders on Systems within the WCUWE of the CCDSVM:

The accessing and managing a file system always is an important part of a computer user work environment (CUWE) in the past. Supporting a file system to be accessed by users across a network has always being a challenge to many vendors. With this invention, a user can manage storage volumes of the entire CCDSVM from a web browser 9 and further can create, manage, and access the file system residing either on the control management system 2 or on anyone of the system units 3. With a sophisticate method of using the multi-layer item list as shown in FIG. 4 together with the operation menu shown in FIG. 5 for the file system in the WCUWE of the CCDSVM, users can efficiently access and manage files and folders in file systems from a web-browser 9 on the fly without using cached anything.

In one embodiment, the multi-layer item lists (MLIL) is used to represent an actual folder structure of a file system on a target system of the CCDSVM. The MLIL has each node (item) to represent a folder or a file, or the file system. When a user navigates the file system through mouse-clicking on the MLIL to operate a file or folder from a web-browser 9, only a small piece of information, which is related to the file or folder, needs to be retrieved or transmitted between the target system of the CCDSVM and the control management system 2. For example, if the user wants to add or delete an item such as a folder, the only major information needs to be transmitted is a folder name to be transferred from the control management system 2 to the target system, and the target system shall carry out the task for adding or deleing the folder. If a user wants to access information, which is under a current item on the MLIL, such as access information of a folder, after sending the folder name, the only information that needs to be retrieved from the target system is the sub-folder or file names if there is any under the current folder. If the user wants to set access permission for a file or a folder on the target system for one or multiple users to access, the target system information and file or folder information on the network need to be bound with each user's profile. The target systems could be either the control management system 2 or anyone of the system units 3 in the CCDSVM.

If a user needs to view or edit the content of a file on a system unit 3, the file may be transmitted via the communication link of net 1 & net 2 directly from the target system unit 3 to the client host 10 or the console host 1, without going through the control management system 2. If the file is on the control management system 2 and users like to view or edit it from a remote system, the file is transmitted via the communication link of the net 1 to the client host 10 or the console host 1. With a proper viewing tool on the client host 10 or the console host 1 or the control management system 2, which may be invoked from the web-browser 9, the user is able to view the contents of the file. With a proper editor, user can further edit the file and then transmit the edited file back to the target system. The target system could be either the system unit 3 or the control management system 2. Alternatively, the file may also be transmitted from the target system to the control management system 2 and then convert it from original format to a format, which may be viewed and edited in the web-browser 9. After converting, if the target system is not the control management system 2, the file can be transmitted via the communication link of the net 1 or net 2 from the control management system 2 to the client-host 10, or the console host 1 for viewing or editing with a web-browser 9. If the target system is the control management system 2 itself, there would be no such transmission required.

The Support of the Automatically & Dynamically Provisioned Groups of Systems in the WCUWE of the CCDSVM:

Network information is an important part of a WCUWE. In one embodiment, the server units 3 of the CCDSVM can be automatically and dynamically provisioned into multiple groups based on their group ID, where each group contains at least one of the server units 3 ("provisioned system").

To effectively access and manage such grouped system units 3 and their associated devices configured thereof, such as storage or network interface cards, or terminal monitor, or video & audio recorder (e.g., camcorder), or keyboard & mouse, or wireless devices or file systems on each of the system units 3 on a network, the multi-layer item list (MLIL) can be used. Therefore, in one embodiment, the mixed information on the network can be ordered with a top-down fashion. For example, the server-group is placed at top level, the system units 3 is placed at the second level, and the devices or file systems starting from the third level within the MLIL.

More specifically, a node on the MLIL with different levels or types may associate with a different type of operation menu. For example, a node of a system unit 3 on an MLIL may be associated with an operation menu containing options of system status, shutdown, storage management, and change usage; and a node of storage device may be associated with an operation menu containing options of creating a storage volume, displaying storage volume, combine storage volume, and deleting a storage volume and so on. After converting all information associated with the MLIL to said standard structured format, the complex information on the network can be viewed and operated by a user from a web-browser 9.

For example, FIG. 7 shows the example of how can the system units 3 be provisioned into multiple groups. FIG. 8 shows the example of how can a device such as storage be listed under the server units 3 in a group. FIG. 9 shows an example of how can a file system on a system unit 3 in a group be accessed. The method of automatically and dynamically grouping the system units 3 and wisely using the MLIL to represent the diversified resources on the network, the entire CCDSVM can be much more efficiently accessed, operated, and managed. For example, through mouse clicks on a web-browser 9, privileged users can create storage volumes from a fresh disk on a target system and make a file system on each of the storage volumes, mount the file system and create a folder structure on the file system, and further setup an access control for a folder or file on the file system for permitting a user with limited privileges to access. Therefore, the WCUWE can securely let the permitted user access to the folder or file from a web-browser anywhere on the network.

The Support of the User Administration & Authentication in a WCUWE of the CCDSVM:

Initially, a WCUWE allows a default super user to login the WCUWE of the CCDSVM and to access an authentication web-page provided by the console support software 6. The privileged user can setup other privileged or non-privileged user account profiles thereafter. Similar to a file system in the WCUWE of the CCDSVM, a user profile can be viewed and operated by using an MLIL combined with a web-based operation menu The MLIL need to be converted to a standard structured format, which can be viewed and accessed by the user from a web-browser 9. Therefore, through mouse click on the MLIL for user profile and through a web-based operation menu, the user and user profile creating, viewing, updating, deleting and others all can be conveniently performed. Specially, the privileged users can setup profiles for other non-privileged users for said secure access control. In addition, the user information and their security profiles can be kept in a form of a database, which could be a commercial database on the market, or a plaint text file, or a binary record file, or others.

The present invention has been described in considerable details with preference to certain preferred versions, examples, and figures; however, other versions, and samples are also possible. Therefore, the spirit and scope of the appended claims should not be limited to the description of the preferred versions and samples contained herein.

What is claimed is:

1. A method for remotely access resources in a resource structure, the method comprising:
   creating, by a server, a hierarchical list to represent in a reduced form the resource structure, and
   sending the hierarchical list to a remote device for the hierarchical list being displayed on the remote device for a user session of a user, and facilitating the user to select a resource from the displayed hierarchical list and submit a request for access the selected resource in the resource structure during the user session;
   updating the hierarchical list and updating the resource structure according to the request for access the selected resource received from the remote device, and
   sending the updated hierarchical list to the remote device to be displayed thereon to reflect the updated resource structure; and
   deleting the hierarchical list upon an exit of the user session.

2. The method as recited in claim 1, wherein the server creates the hierarchical list in memory for the user session, updates the hierarchical list in the memory according to a received request during the user session; and deletes the hierarchical list from the memory upon an exit of the user session.

3. The method as recited in claim 2, wherein the hierarchical list comprises a plurality of nodes, at least one of the nodes including attributes for one of resources in the resource structure, the attributes being operatively displayed to the user for said access.

4. The method as recited in claim 3, wherein the at least one of the nodes associates with a graphic indicator for graphically representing the one of the resources and associates with an operation menu for operating the one of resources for said access.

5. The method as recited in claim 1, wherein said hierarchical list is expandable and reducible through navigating with mouse-like clicking during the user session to explore and display contents of the resource structure at different levels.

6. The method as recited in claim 5, wherein the display of the contents of the resource structure further includes:
displaying full contents of a selected resource, the full contents including at least one second level resource organized under the selected resource and at least one third level resource organized under the at least one second level resource.

7. The method as recited in claim 1, wherein the resource structure further is one of a computing system of a plurality of computing devices, a folder structure for a plurality of files and folders, or a storage system of a plurality of storage servers and storage devices configured among the storage servers.

8. A server for supporting remote access to resources in resource structures, the server comprising:
at least one hardware processor, and
one non-transitory computer-readable medium comprising program code which, being executed by the at least one hardware processor, causes the server to:
create a first hierarchical list to represent a first resource structure, and
send the first hierarchical list to a first device for the first hierarchical list being displayed on the first device for a user session of a first user, and facilitate the first user to select a resource from the displayed first hierarchical list and submit a request for access the selected resource in the first resource structure during the user session;
update the first hierarchical list and update the first resource structure according to the request for access the selected resource received from the first device, and
send the updated first hierarchical list to the first device for being displayed thereon to reflect the updated first resource structure; and
delete the first hierarchical list upon an exit of the user session.

9. The server as recited in claim 8, wherein the server creates the first hierarchical list in memory for the user session, updates the first hierarchical list in the memory according to a received request during the user session; and deletes the first hierarchical list from the memory upon an exit of the user session.

10. The server as recited in claim 9, wherein the first hierarchical list comprises a plurality of nodes, at least one of the nodes comprising attributes for one of the resources in the first folder structure.

11. The server as recited in claim 10, wherein the at least one of the nodes associates with a graphic indicator for graphically representing the one of resources and with an operation menu for operating the one of the resources.

12. The server as recited in claim 8, wherein said first hierarchical list is expandable and reducible through navigating with mouse-like clicking during the user session to explore and display contents of the first resource structure at different levels.

13. The server as recited in the claim 12, wherein the display of the contents of the first structure further comprises:
displaying full contents of a selected resource, the full contents including at least one second level resource organized bellow the selected resource and at least one third level resource organized bellow the at least one second level resource.

14. The server as recited in the claim 8, wherein the display of the contents of the first resource structure further comprises displaying the first hierarchical list in a web based user interface or in a non-web based user interface on the first device.

15. The server as recited in claim 8, wherein the resource structure further is one of a computing system of a plurality of computing devices, a folder structure for a plurality of files and folders, a storage system of a plurality of storage servers including storage devices configured thereof.

16. The server as recited in claim 15, wherein said resource structure of a computing system further comprises resources distributed amount the computing devices, where said resource comprises computing power of a CPU, a memory capability, a storage capacity, files in the storage including application program, text, document, video, and photo image files, what characteristics of a network device, a monitor or other devices.

17. The server as recited in claim 8, wherein the program code further cause the server to create a second hierarchical list representing the first resource structure for a second session associated with a second device from which a second user via the second hierarchical list displayed operatively submits a request for access resources in the first resource structure.

18. The server as recited in claim 8, wherein the program code further cause the server to create a second hierarchical list representing a second resource structure for a second session associated with a second device from which a second user via the second hierarchical list displayed operatively submits a request for access resources in the second resource structure.

19. A program product configured in a non-transitory computer-readable medium of a server and comprising program instructions that, being executed by the server, cause the server to facilitate access to resources in resource structures, wherein the program instructions comprise:
program instructions for creating a first hierarchical list to represent a first resource structure, and
program instructions for sending the first hierarchical list to a first device for the first hierarchical list being displayed on the first device for a user session of a first user, and program instructions for facilitating the first user to select a resource from the displayed first hierarchical list and submit a request for access the selected resource in the first resource structure during the user session;
program instructions for updating the first hierarchical list and updating the first resource structure according to the request for access the selected resource received from the first device, and
program instructions for sending the updated first hierarchical list to the first device to be displayed thereon to reflect the updated first resource structure; and
program instructions for deleting the first hierarchical list upon an exit of the user session.

20. The program product as recited in claim 19, wherein the program instructions causing the server to facilitate users access to resources further cause the server to create the first hierarchical list in memory for the user session, update the first hierarchical list in the memory according to received request during the user session; and delete the first hierarchical list from the memory upon an exit of the user session, and further cause the server to create a second hierarchical list representing the first resource structure for a second session associated with a second device from which a second user via the second hierarchical list displayed operatively submits a request for access the first resource structure.

21. The program product as recited in claim 19, wherein the program instructions causing the server to facilitate users access to resources further cause the server to create a second hierarchical list representing a second resource structure for a second user session associated with a second device from which a second user via the second hierarchical list displayed operatively submits a request for access the second resource structure.

* * * * *